United States Patent [19]

Nuttle

[11] Patent Number: 4,656,770

[45] Date of Patent: Apr. 14, 1987

[54] BIRD REPELLING MEANS

[76] Inventor: David A. Nuttle, Rte. 2, Youngsville, N.C. 27596

[21] Appl. No.: 791,989

[22] Filed: Oct. 28, 1985

[51] Int. Cl.$^4$ ............................................. A01M 29/04
[52] U.S. Cl. ......................................... 43/2; 446/178; 446/213; 116/22 A; 43/1
[58] Field of Search ................. 43/2, 1; 116/22 A, 23, 116/24, 140, 141; 446/176, 178, 213, 216; 40/440, 455

[56] References Cited

U.S. PATENT DOCUMENTS

| | | |
|---|---|---|
| 333,611 | 1/1886 | Daveggio ..................... 446/213 X |
| 1,167,502 | 1/1916 | Huffman et al. ..................... 40/455 |
| 1,442,290 | 1/1923 | Pallone ..................... 40/455 |
| 2,788,762 | 4/1957 | Wright ..................... 116/22 A |
| 2,941,197 | 6/1960 | Marotta ..................... 116/22 A |
| 3,412,394 | 11/1968 | Lewis et al. ..................... 116/22 A |
| 4,131,079 | 12/1978 | Rousseau, Jr. et al. ..................... 116/22 A |

FOREIGN PATENT DOCUMENTS

| | | |
|---|---|---|
| 2338094 | 2/1975 | Fed. Rep. of Germany ............ 43/2 |
| 197809 | 9/1978 | United Kingdom ............. 116/22 A |
| 2034164 | 6/1980 | United Kingdom ..................... 43/1 |

Primary Examiner—Nicholas P. Godici
Assistant Examiner—Carmine Cuda
Attorney, Agent, or Firm—Mills & Coats

[57] ABSTRACT

This invention is a combination of visual and aural devices to create panic in selected bird species. This is accomplished in part through a body simulating a Tiger Cat which is weathervane mounted. The body includes bright orange stripes and has predatory eyes. Streamers depicting paniced birds are attached to the tiger's tail and an internal wind driven flute produces a variety of the noises. Additionally, reflectors are used on a propeller to simulate light reflection from a gun barrel. Further, random or scheduled explosions from an automatic acetylene exploder and bird warning and distress calls are broadcast over loud speakers for the species of birds being repelled.

24 Claims, 6 Drawing Figures

BIRD REPELLING MEANS

FIELD OF INVENTION

This invention relates to repelling means and more particularly to harmless means for repelling birds.

BACKGROUND OF INVENTION

Bird controls using aural and visual signals are currently in widespread use for crop control, at airports, and similar locations where the presence of birds is undesirable. Although some of these methods have met with limited success, quite often the birds are either harmed or tend to become accustomed to and subsequently ignore the false threats. Birds also can, through consistent and varied stimulation, change their habit patterns to defeat the repelling devices.

Research into bird behavior and the effects of various repelling methods discloses that birds are very habitual creatures, requiring great persistence to effectuate a change in habit. Although birds become accustomed to non-lethal threats and learn to ignore them, they are responsive to alarm and distress calls of their own species. Birds generally are frightened by loud explosions, bright colors, and distress signals from other birds.

Utilizing the research results, a shotgun, acetylene and similar explosions have been used as well as recordings of the pest birds in distress played over loudspeakers. Also, pictures or models of predators with prevalent predator eyes had some deterent effect. Not withstanding short-term successes, the birds have tended to become accustomed to the lack of variety in the application of these repelling means and have tended to ignore the same.

SUMMARY OF INVENTION

After much research and study into the above mentioned problems, the present invention has been developed to provide an economical and ecologically effective means and method of repelling birds.

The above is accomplished through the provision of a rotating, disk-controlled flute having a variety of pitches. The flute is mounted within the body of a weathervane mounted predator with streamers depicting paniced birds attached thereto. Therefore, combined with a reflective propeller shaft, predator eyes, and a system of random explosions are broadcasts of previously recorded bird distress and panic calls to prevent the birds from becoming accustomed to the signals and to eventually force the birds from the area.

In view of the above, it is the object of the present invention to provide an effective bird repelling means wherein the birds do not become accustomed to the same.

Another object of the present invention is to provide a predator-bodied repelling means which pivots freely so as not to appear static to the birds being repelled.

Another object of the present invention is to provide a combination of freely pivoting predator body and predator eyes with streamers depicting paniced birds.

Another object of the present invention is to provide a predator body in combination with explosive sounds, bird distress signals, and random flute sounds to harmelessly repel birds from a given area.

Another object of the present invention is to retrain birds to avoid a particular area through a combination of repelling means and methods Another object of the present invention is to provide an ecologically sound method of repelling birds which is not hazardous to man, birds, or the environment.

Another object of the present invention is to provide a relatively inexpensive and yet highly efficient means and method of repelling birds from a specified area.

Another object of the present invention is to provide an energy efficient means of repelling birds.

Another object of the present invention is to provide a bird repelling means which is both wind driven and electrically driven with automatic battery recharging to provide a completely unattended repelling system.

Other objects and advantages of the present invention will become apparent and obvious from a study of the following description and the accompanying drawings which are merely illustrative of such invention.

BRIEF DESCRIPTION OF INVENTION

DETAILED DESCRIPTION OF INVENTION

Figure 1:
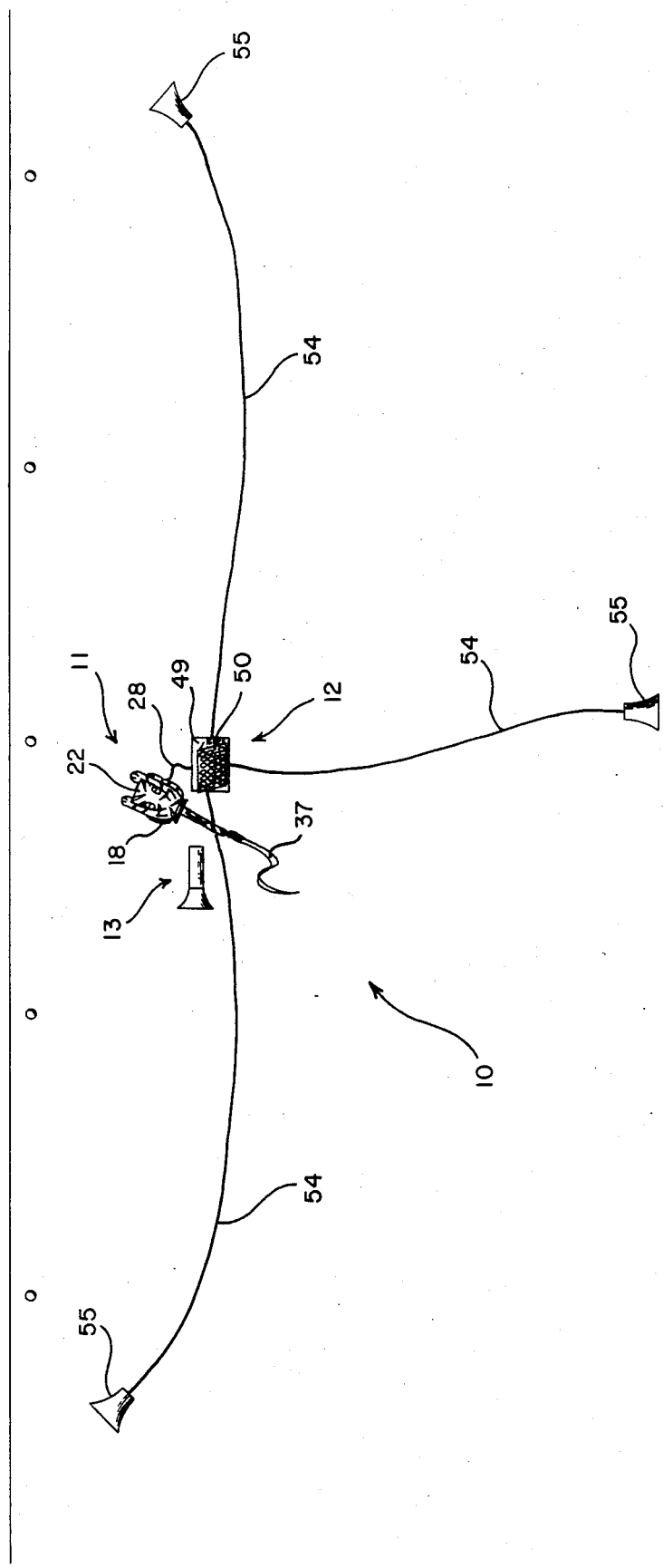
FIG. 1 is a somewhat schematic view of the bird repelling means of the present invention.

With further reference to the drawings, the bird repelling means of the present invention, indicated generally at 10, includes the predator portion 11, a bird call broadcast portion 12, and an automatic exploder portion, indicated generally 13.

The predator portion 11 of the present invention includes a support mast 14 which is firmly implanted in the ground 15. Since the method of implanting masts in the ground is well known to those skilled in the art, further detailed discussion of the same is not deemed necessary.

Figure 2:
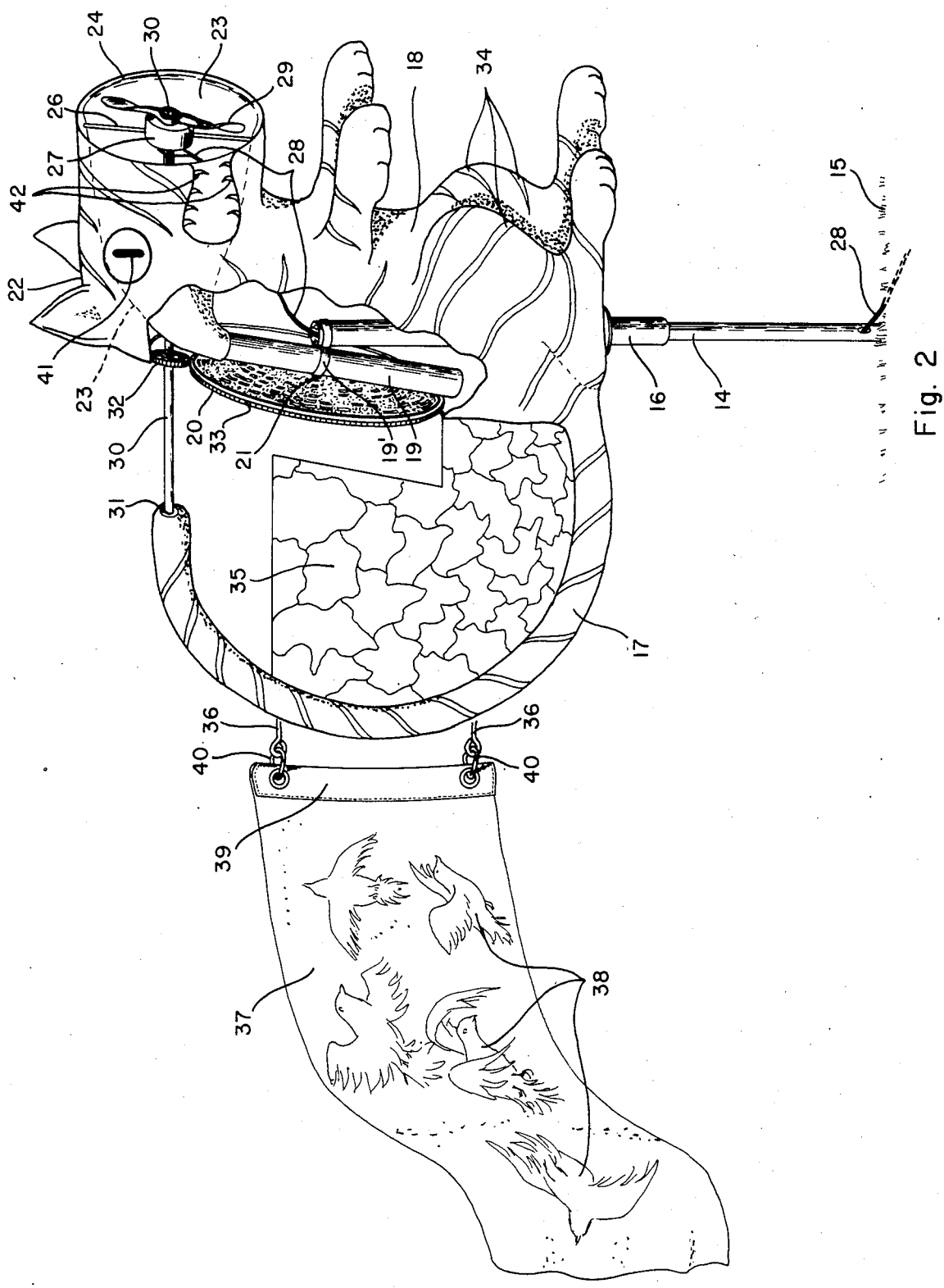
FIG. 2 is a perspective view of the predator body portion of the present invention.
Figure 3:
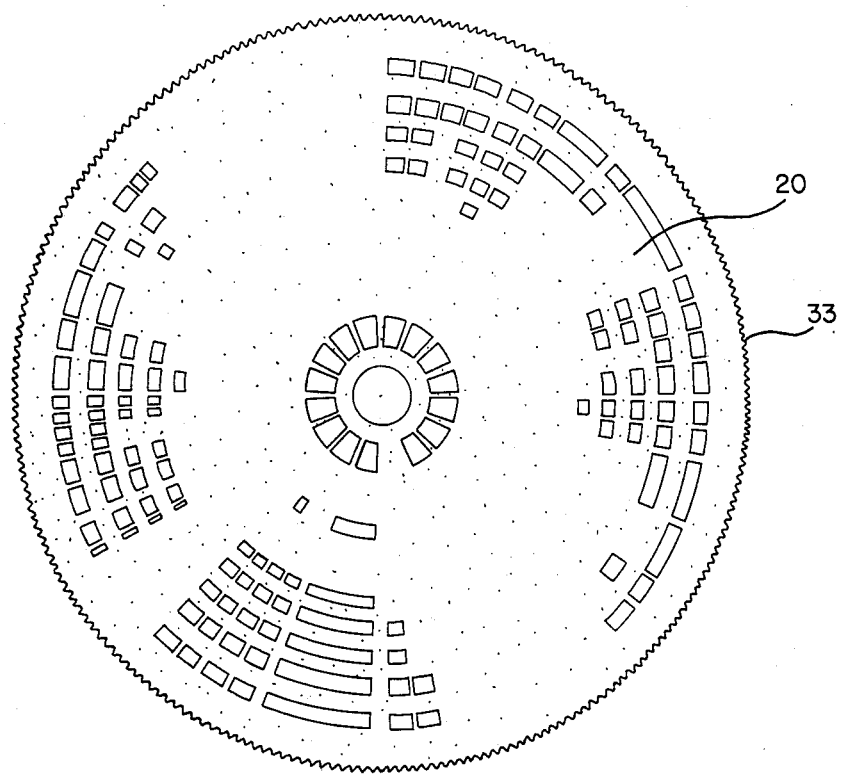
FIG. 3 is a plan view of the flute control disk.
Figure 4:
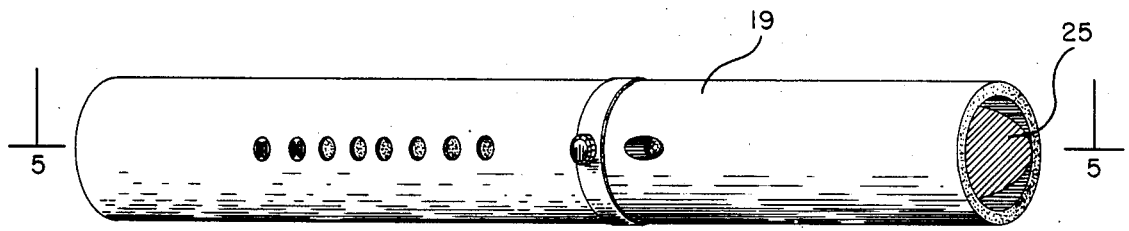
FIG. 4 is a plan view of the flute body.
Figure 5:
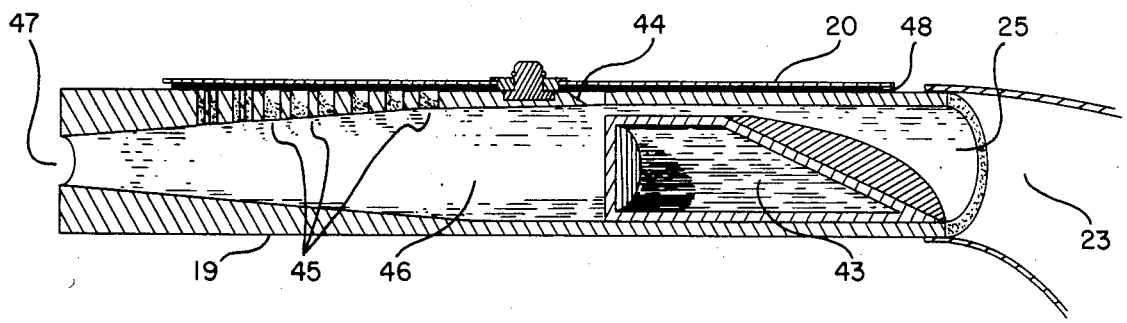
FIG. 5 is a sectional view showing the flute disk and flute body in operative relationship.
Figure 6:
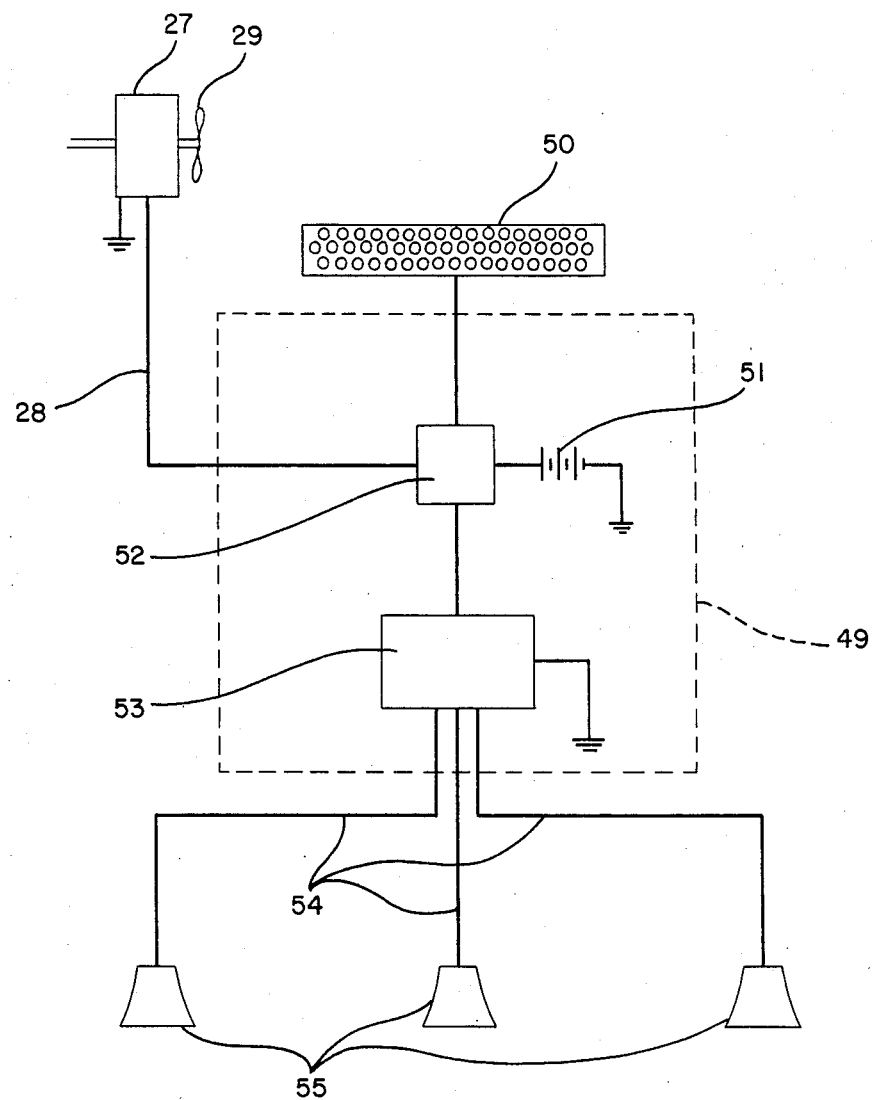
FIG. 6 is a schematic of the electrical/electronic portion of the present invention.

Sleeve 16 is pivotably mounted on the upper portion of support mast 14. A generally C-shaped frame 17 is secured to the upper portion of pivotable sleeve 16 and extends rearwardly and upwardly as can clearly be seen in FIG. 2.

A predator body 18, formed from fiberglass or similar material, is mounted on the C-shaped frame with the curved rear portion of such frame forming the tail of the predator. Since the mounting of the molded predator body 18 on frame 17 is well within the abilities of those skilled in the art, further detailed discussion of the same is not deemed necessary.

Freely pivotable sleeve 16 extends upwardly through the predator body 18 with flute 19 secured thereto by bracket 19' or other suitable means.

Player disk 20 for controlling the flute noises is rotatively mounted on shaft 21 as will hereinafter be described in greater detail.

The front of the head portion 22 of the predator body 18 is open-ended and is generally symmetrical in shape. A funnel-shaped lining 23 extends from the open end 24 of head 22 to the mouth 25 of flute 19.

Brackets 26 operatively mount electric motor/generator 27 centrally in the open end 24 of predator head 22. Electrical conductors 28 extend from motor/generator 27 down through sleeve 16 and support mast 14. A rotating electrical contact should be provided since sleeve 16 freely pivots relative to mast 14. Since electrical contacts of this type are well known to those skilled in the art, further detailed discussion of the same is not deemed necessary.

A propellor 29 is mounted on one end of shaft 30 and drives/is driven by motor/generator 27. The shaft 30 extends through the motor/generator and the end opposite propellor 29 is rotatively mounted in bearing 31 at the upper end of C-shaped frame 17.

A plurality of flat areas are provided on shaft 30 as indicated at 30'. As the shaft turns, light will be reflected from these areas to simulate light flashing off a gun barrel.

A drive gear 32 fixedly secured to shaft 30 is adapted to engage the toothed edge 33 of player disk 20 to rotate the same as will hereinafter be described in greater detail.

The exterior of the predator body, head and tail is preferably orange in color with narrow bright orange stripes 34 periodically spaced therealong. Affixedly secured interiorly of the generally C-shaped frame/tail of the predator is a tail fin 35 which has a camouflage design displayed thereon to accentuate the predator figure. The tail fin 35 also acts as a fin for weathervaning the predator portion 11 of the present invention.

A pair of eyelets 36 are provided on the exterior arc of frame/tail 17. A burgee or streamer 37 formed from a flexible sheet-type material has pictures of panic stricken birds 38 printed thereon. The attachment end of the burgee or streamer includes a header 39 of relatively stiff material with snap hooks 40 on either end thereof. Thus it can be seen that the streamer can readily be unsnapped and replaced depending upon the species of birds being repelled.

The head 22 of the predator includes on opposite sides thereof, predator eyes 41 for instilling fright into the birds being repelled. Also, snarling teeth 42 are depicted on opposite sides to further frighten said birds.

Referring more specifically to the flute repeller, the interior end of the funnel-shaped lining 23 terminates at the mouth or inlet end 25 of flute 19. The flute has a standard sound drum 43, reed/whistle outlet 44, and sound varying recorder holes 45. These recorder holes are preferably so sized, from smallest to largest, for the notes F-10 through F-2, and T-1. The end of the open resident chamber 46 terminates in the normal outlet opening 47.

A felt gasket 48, which is simply a strip of felt with openings corresponding to the recorder holes is provided and is glued or otherwise secured to the exterior surface of flute 19.

The player disk 20 includes a plurality of series of predetermined openings in outwardly radiating circles, the spacing of such circles corresponding to each of the recorder holes 45 of the flute 19. Thus it can be seen that by providing predetermined openings in each of the radiating circles, the various note holes 45 will be alternately opened and closed to play any predetermined tune or varying sound.

The player disk 20 is readily installable on and removable from shaft 21 so that the sounds emitted from flute 21 can be periodically varied as desired by adding a different disk with another sound pattern.

The bird call broadcast portion 12 of the present invention includes a housing 49. A battery 51 is provided within housing 49 and is operatively connected through electronic controller 52 to solar charging panel 50.

The electric motor/generator 27 is also connected through electrical conduit 28 to electronic controller 52. Thus it can be seen that whenever adequate light is available, solar panel 50 will charge battery 51. Also, whenever the wind has adequate velocity to drive propellor 29 at a predetermined speed, electricity will be generated to charge battery 51.

Whenever there is not adequate wind to drive propellor 29 fast enough to operate the flute 19, the generator 27 will operate in the motor mode, obtaining power stored in battery 51. Since motor/generator devices, electronic controls, solar charging panels, and battery storage systems are all well known to those skilled in the art, further detailed discussion of these features are not deemed necessary.

A recording play back device 53 is operatively connected to electronic control 52. This recording play back device can be of any suitable type for playing records, tapes, or the like. The recordings are, of course, changable so that different species of bird distress and panic calls can be used. The electronic control 52 can be programmed to periodically activate the record play-back device 53. Since the record play-back devices are well known to those skilled in the art, further detailed discussion of the same is not deemed necessary.

The recording play back device 53 is operatively connected through speaker cables 54 to loud speakers 55. These speakers are, of course, of the weatherproof-type and are disposed in different directions to cover maximum area with their bird repelling sounds.

One or more acetylene exploders or carbide cannons 56 are operatively connected through line 57 to controller 52 so that they can be periodically set off. Since the control and firing of acetylene exploders and carbide cannons are well known to those skilled in the art, further detailed discussion thereof is not deemed necessary.

To use the bird repelling means and method of the present invention, the system is set up in the area where it is desired to repel birds from such as agricultural fields, gardens, orchards, airports, and the like. The predator portion is pivotably installed for weathervaning as hereinabove described. The bird call broadcast portion has its speakers 55 deployed in different directions and the exploder portion 13 is installed for maximum startling effect. The housing 49 is centrally located and all of the various systems are operatively connected to the components housed therein.

Once this system of the present invention has been set up as hereinabove described, the weathervaning Tiger Cat with its orange stripes, predator eyes, and streamer with pictures of panic stricken birds gives a constant visual threat with movement being generated by ambient wind.

Reinforcement of the visual threats is also constantly provided in the form of light reflections off the simulated gun barrel caused by the turning of shaft 30 with its flat reflective portions 30'. Also, a constant audio threat is provided in the form of the various sounds emitted from the wind flute. This latter constant threat can, of course, be periodically changed by changing the player disk therein.

In addition to the above, the acetylene exploder or carbide cannon is set to explode every five to twenty minutes with the actual explosion frequency being changed randomly every two to three days at five minute intervals, i.e., 5, 10, 15, or 20. Warning and/or distress calls of the targeted bird population are recorded in the wild and replayed by device 53 over three or four field speakers 55 distributed over a two to five acre area around the predator portion 11. These distress sounds or calls are played for approximately two minutes following each explosion.

For the first five days of operation and periodically several times per week thereafter, a person will fire shot-type shells having salt or sand in place of the usual lead load. These shot shells will not kill the birds but will create a real physical threat which they will associate with the sights and sounds hereinabove described.

Although the above described operational procedures work well, variations, of course, can be used to adapt to various species of birds.

From the above it can be seen that the present invention provides a relatively large variety of repelling means taking the best features from each to provide a system that will change the habit of birds and permanently repel them from the designated area to be cleared. The system is basically self-contained and requires very little maintenance with only the occassional changing of components to vary the sights and sounds so that the birds do not become accustomed to repetitive repellents.

The present invention can of course be carried out in other specific ways without departing from the spirit and essential characteristics of the invention. The present embodiments are, therefore, to be considered in all respects as illustrative and not restrictive and all changes coming within the meaning and equivalency range of the appended Claims are intended to be embraced therein.

What is claimed is:

1. A bird repelling means comprising: predator simulating means; a wind driven flute mounted within said predator simulating means; means for mechanically altering the tone of said wind driven flute; means for periodically broadcasting prerecorded bird warning and panic calls; and means for periodically creating explosion-type noises whereby the simulated predator will act as a visual bird repelling means while the wind flute, periodic broadcast and explosions will act as an aural means of repelling said birds.

2. The bird repelling means of claim 1 wherein said simulated predator includes a pair of predator eyes.

3. The bird repelling means of claim 1 wherein said simulated predator includes predator teeth.

4. The bird repelling means of claim 1 wherein said mechanical flute playing means is a rotating disk.

5. The bird repelling means of claim 1 wherein said simulated predator is pivotably mounted whereby ambent winds will cause a weathervaning effect which in turn imparts realistic movement to said simulated predator.

6. The bird repelling means of claim 1 wherein said broadcasting means is a recording play back type device operatively connected to a plurality of loud speakers.

7. The bird repelling means of claim 1 wherein the means for periodically creating loud explosion-type noises is an acetylene exploder.

8. The bird repelling means of claim 1 wherein said means for creating loud explosion-type noises is a carbide cannon.

9. The bird repelling means of claim 1 including a predator head having a windsock-shaped lining for catching and directing air into the mouth of said flute.

10. The bird repelling means of claim 9 wherein a motor/generator is operatively mounted in the entrance of said windsock-shaped lining and is driven by propellor means whereby when adequate wind velocity is available to play said flute means, electricity is generated as the propellor turns, and when adequate wind is not available, said propellor can be driven to create the required velocity.

11. The bird repelling means of claim 1 wherein the simulated predator has stripes.

12. The bird repelling means of claim 11 wherein said stripes are bright orange in color.

13. The bird repelling means of claim 1 wherein said simulated predator includes a flexible streamer tail.

14. The bird repelling means of claim 13 wherein said streamer includes pictures of panic stricken birds thereon.

15. The bird repelling means of claim 14 wherein said streamer is readily replacable whereby the pictures of panic stricken birds can be readily replaced.

16. The bird repelling means of claim 1 wherein gun barrel simulating reflector means are provided in conjunction with said predator body.

17. The bird repelling means of claim 16 wherein said reflector means are flat reflector surfaces provided on a rotatable shaft operatively mounted on said predator body.

18. The bird repelling means of claim 1 wherein a programmable controller means is utilized to coordinate the various functions thereof.

19. The bird repelling means of claim 19 wherein said controller means is battery powered.

20. The bird repelling means of claim 19 wherein said battery means is at least partially charged by at least one solar panel.

21. The bird repelling means of claim 19 wherein said battery is at least partially charged by a wind driven generator means.

22. The bird repelling means of claim 19 wherein said battery means is charged by a combination of at least one solar panel and a wind driven generator means.

23. A bird repelling means comprising: predator simulating means; a wind driven flute operatively associated with said predator simulating means; and means of mechanically altering the tone of said flute whereby an improved visual and aural repelling means is provided.

24. The bird repelling means of claim 23 wherein said wind flute includes a plurality of sound varying holes and said tone altering means includes a rotating disk having a plurality of openings alignable with said sound varying holes to open and close the same as said disk rotates.

* * * * *